US011174106B2

(12) United States Patent
San Miguel Nuñez

(10) Patent No.: US 11,174,106 B2
(45) Date of Patent: Nov. 16, 2021

(54) SYSTEM AND METHOD FOR MONITORING MODULAR CONVEYOR BELTS

(71) Applicant: AFHER EUROBELT, S.A., Valladolid (ES)

(72) Inventor: Javier San Miguel Nuñez, Valladolid (ES)

(73) Assignee: AFHER EUROBELT, S.A., Valladolid (ES)

( * ) Notice: Subject to any disclaimer, the term of this patent is extended or adjusted under 35 U.S.C. 154(b) by 0 days.

(21) Appl. No.: 16/975,341

(22) PCT Filed: Feb. 28, 2019

(86) PCT No.: PCT/EP2019/054953
§ 371 (c)(1),
(2) Date: Aug. 24, 2020

(87) PCT Pub. No.: WO2019/166536
PCT Pub. Date: Sep. 6, 2019

(65) Prior Publication Data
US 2021/0032043 A1    Feb. 4, 2021

(30) Foreign Application Priority Data

Mar. 2, 2018 (EP) .................................... 18382131

(51) Int. Cl.
*B65G 43/02* (2006.01)
*B65G 17/08* (2006.01)
*B65G 23/06* (2006.01)

(52) U.S. Cl.
CPC .............. *B65G 43/02* (2013.01); *B65G 17/08* (2013.01); *B65G 23/06* (2013.01); *B65G 2203/0291* (2013.01); *B65G 2203/045* (2013.01)

(58) Field of Classification Search
CPC ........ B65G 43/02; B65G 43/04; B65G 43/00; B65G 23/04; B65G 23/44; B65G 2203/042
USPC ............................ 198/502.4, 810.02, 810.01
See application file for complete search history.

(56) References Cited

U.S. PATENT DOCUMENTS

| 5,230,418 A | * | 7/1993 | Agnoff | ..................... G01P 3/486 |
| | | | | 198/502.4 |
| 5,291,131 A | * | 3/1994 | Suzuki | ................... G01B 7/042 |
| | | | | 324/206 |
| 5,337,885 A | * | 8/1994 | Mills | ..................... B65G 19/10 |
| | | | | 198/502.1 |

(Continued)

FOREIGN PATENT DOCUMENTS

| DE | 102010043057 | * | 5/2012 | ............. B65G 43/10 |
| DE | 102016111421 | * | 12/2017 | ............. B65G 43/00 |

*Primary Examiner* — James R Bidwell
(74) *Attorney, Agent, or Firm* — Arent Fox LLP

(57) ABSTRACT

A system and method arranged for monitoring modular conveyor belts. The modular conveyer belt comprises a plurality of modules made from a plastic material and linked together to form a continuous path operated by a gear which in turn comprises a shaft. The system further comprises at least two sensors in such a way that a first sensor is configured for detecting the passage of reference element in the drive shaft, and at least a second sensor which is configured for detecting the passage of two consecutive reference elements inserted in the longitudinal edges of the modules.

8 Claims, 3 Drawing Sheets

(56) References Cited

U.S. PATENT DOCUMENTS

| | | | | |
|---|---|---|---|---|
| 5,490,590 A * | 2/1996 | Courtney | ............... | B65G 43/00 |
| | | | | 198/502.1 |
| 6,047,814 A * | 4/2000 | Alles | ...................... | B65G 43/02 |
| | | | | 198/810.02 |
| 7,540,374 B2 * | 6/2009 | Rathbun | ................ | B65G 43/02 |
| | | | | 198/502.1 |
| 9,896,276 B2 * | 2/2018 | Brown | ................... | B65G 43/02 |
| 10,145,770 B2 * | 12/2018 | Frost | ........................ | G01N 3/56 |
| 2008/0308391 A1 * | 12/2008 | May | ....................... | B65G 43/02 |
| | | | | 198/810.02 |

* cited by examiner

SYSTEM AND METHOD FOR MONITORING MODULAR CONVEYOR BELTS

This application is a 35 U.S.C.§ 371 National Phase of PCT Application No. PCT/EP2019/054953, filed Feb. 28, 2019, which claims priority to European Application No. 18382131.3, filed Mar. 2, 2018, the disclosures of which are hereby incorporated by reference herein.

As indicated in the title of the present specification, the object of the present invention is a system and method for monitoring modular conveyor belts based on the measurements of their working temperature and of specific times to then calculate, by means of mathematical formulas, a plurality of belt factors at all times when it is in motion.

TECHNICAL FIELD

The present invention is comprised in the technical field of predictive modular conveyor belt maintenance for determining if the belt is working properly and predicting a malfunction of the system, preventing possible unexpected damage and/or downtimes.

PRIOR ART

Link-based conveyor belts are made from a thermoplastic material and are widely known in the prior art (as described, by way of example, in patent document EP14788144). One of the most common solutions is that belt in which a planar and frequently grooved core is defined in each link, although it can also be closed, depending on the type of practical application or use of the belt. The core of each link generally coincides with the thickness of the belt, or with that of at least one of the modules, from the longitudinal edges of which there emerge a series of protuberances like one-piece elements distributed in a staggered pattern on both edges, and making the link look like a "dual comb", these protuberances furthermore being perforated to give passage to the hinge pins between links, forming the conveyor belts themselves which are driven by means of sprockets.

When this type of conveyor belt is working, elongation always occurs due to: (i) the stretching of the links or modules, or the hinge pins, or both; and (ii) the wear resulting from use and operation. These elongations will naturally be affected by the conditions in which the conveyor belt is working at all times, and this thereby leads to the need to have said information in order to know it, process it, and predict possible breakages, stoppages, and to ultimately prolong the service life thereof. In dealing with problems of this type, the solution that is most commonly used in the industry when the belt undergoes elongation, i.e., when the belt "stretches", is to gradually remove the rows so that the gears do not lose tension and do not slip.

There are described in the prior art different systems configured for measuring the elongation of conveyor belts measuring speed with linear sensors that are separated by a certain distance, of a type using two indications in the conveyor belt and two sensors. In this sense, patent document U.S. Pat. No. 5,291,131 describes an apparatus comprising a chain configured in a closed loop and arranged to move in a circulating path, a device for measuring the elongation of the chain comprising a pair of indices or indications on the chain, where said indications are spaced from each other in the direction of movement of the chain; a pair of sensors, disposed at predetermined positions along the path of the chain for detecting said indices and producing signals as the indices pass said predetermined positions. The device of patent document U.S. Pat. No. 5,291,131 is completed with calculating means, responsive to said signals produced by the sensors, for arithmetically determining elongation of said chain on the basis of the distance between said sensors and the time required for each of said indices to pass both of said sensors.

Patent document EP1464919 describes a method for automatically monitoring the wear of a chain when in operation in a chain drive assembly, comprising the steps of applying first and second markers to the chain at a predetermined distance apart along the length of the chain, positioning a first sensor adjacent to the chain to coincide with the position of the first marker, positioning a second sensor adjacent to the chain to coincide with the position of the second marker, the sensors being capable of generating signals in response to the detection of the proximity of the markers, operating the chain drive assembly so that the first and second sensors are initially triggered substantially simultaneously by said first and second markers, respectively, detecting elongation of the chain by determining when a predetermined time delay occurs between the triggering of the first and second sensors by the respective markers.

Nevertheless, this method is not anticipated for use in belts made of plastic material because the separation of the sensors will depend on the load on the belt. The length of plastic, for example, changes depending on the belt temperature. Plastic is a resilient elastic material which makes it impossible to simultaneously synchronize a plurality of sensors.

In contrast to the preceding patent documents, patent document ES2566627T3 which proposes a monitoring system for a conveyor of articles with a single indication in the conveyor belt is known in the prior art. The conveyor of articles comprises a static portion and at least one respective endless transport chain movable with respect to the static portion when the conveyor of articles is in operation. The system includes a reference element located on the transport chain, a first sensor fixed relative to the static portion, and a second sensor fixed relative to the static portion. Said first and second sensors are separated from each other by a first distance, each sensor being configured to sense passage of the reference element close to the sensor during the operation of the conveyor. The system furthermore includes a counting unit coupled with the sensors and configured for measuring a first time corresponding to time elapsed between a first passage of the reference element close to the first sensor and a first passage of the reference element close to the second sensor. The counting unit is furthermore configured for measuring a second time corresponding to time elapsed between the first passage of the reference element close to the first sensor and a second passage of the reference element close to the first sensor, or the time elapsed between the first passage of the reference element close to the second sensor and a second passage of the reference element close to the second sensor. Said second passage is subsequent to the first passage. The system furthermore comprises a computing unit configured for determining the transport chain movement speed with respect to the static portion based on the first measured time and the first distance, and determining the length of the chain based on the determined movement speed and the second measured time.

Patent documents U.S. Pat. No. 5,291,131, ES2566627T3, and EP1464919 generally describe systems with a single reference element, i.e., systems that only perform one measurement for each turn of the conveyor belt, wherein the reference element is placed on the conveyor belt for measuring the speed thereof by means of detecting the indication as it passes two sensors placed at a previously fixed distance. The elongation in a complete turn is then calculated using said speed and those same sensors with a simple mathematical formula of speed/time between measurements. In other words, it is a system which measures the elongation of the entire conveyor belt, i.e., the sum of all the modules, and not of each of them separately, as would be desirable. These systems have the drawback of being systems which describe measurements depending on the length and speed of the conveyor, where the response may be too long and cannot be used for its main purpose, which is to prevent possible problems in the belt with enough time in advance. For example, for a conveyor having an axle distance of 30 meters and moving at a speed of 0.5 meters/minute—such as in a conventional cooling line—the elongation of the passage would be measured every hour, so everything that occurred during that period of time is unknown, where this period of time is too long of a downtime. Furthermore, another obvious drawback of these systems is that they do not analyze each of the passages, so malformations in a specific area cannot be detected. In these systems, after detecting the problem, it would be necessary to analyze point-by-point where the problem is.

The preceding patent documents (U.S. Pat. No. 5,291,131, ES2566627T3, and EP1464919) describe systems with a single reference element, i.e., measurement is performed only once per turn, regardless of the presence of two indications on the belt, like in patent documents U.S. Pat. No. 5,291,131 and EP1464919. In these two patent documents, the elongation between those two indications is measured only once per turn, and just with that, the inventors perform an extrapolation to conclude that the belt has been elongated accordingly, committing a serious extrapolation error because they will never be able to detect if there is a problem in another segment of the belt as they only analyze that part of the belt, and furthermore only perform one measurement per turn. However, in patent document ES2566627T3, the problem lies in measuring the passage of a complete turn and performing extrapolation for all the passages. These solutions based on the extrapolation of calculations present the added problem of the frequent removal of a row in modular belts so that there is more tension when the belt stretches, so all the calculations that are programmed for calculating the elongation would be disrupted.

On the other hand, patent document GB2406844 describes a chain elongation monitoring apparatus for automatically monitoring the elongation of a chain when in operation in a chain drive assembly, the apparatus comprising: first and second sensors, where both sensors are mounted on a stationary support at a predetermined fixed distance apart and configured for generating electrical signals in response to the detection of at least first and second markers attached to the chain, the markers being disposed initially at a predetermined distance apart; a control unit connected to said sensors so as to receive the signals from said sensors; the control unit comprising a timer that is triggered upon receipt of said signals from said sensors so as to measure the elapsed time between receipt of signals from the sensors; the control unit being configured to measure a first elapsed time value between signals generated by one of the markers passing between first and second sensors and to determine the speed of travel of the chain from the first elapsed time value and the value of the predetermined distance between the sensors; the control unit also being configured so as to measure a second elapsed time value between signals generated by the first marker passing one of said sensors and the second marker passing one of the sensors; the control unit incorporating means for calculating the distance between the markers from the determined speed of travel of the chain and the first and second elapsed time values, means for calculating the elongation of the chain by deducting the predetermined distance between the markers from the calculated distance between the markers, and means for comparing the calculated elongation with a predetermined threshold value; and an alarm signal generator connected to the control unit and for issuing an alarm signal if the calculated elongation exceeds said threshold value.

Placing an indication or a reference element in each module could be considered to be sufficient to solve the technical problem of measuring the elongation in each of the modules of the belt instead of the entire belt. Nevertheless in the solution set forth in patent document GB2406844, in that case, the distance between the liner receivers (i.e., the sensors) must be smaller than the passage of the chain so as not to get the consecutive signals mixed up or confused, and taking into account that it can be operated in sectors in which the chains may have very small passages (even smaller than 8 mm), it would be practically impossible to operate with systems of this type given that there is no space between measurements, making the correct calculation of the speed of the belt, and therefore of the hypothetical elongation, unviable in practice. There is therefore a need for a system which can measure the elongation of the belt based on the calculation of the elongation of each of the modules making up the modular conveyor belt with respect to the calculation of the complete elongation of the belt.

Patent document EP1850087 describes a method for monitoring the elongation of a revolving drive chain which engages with a rotating gear that increases measurement precision. More specifically, it describes a method for monitoring the elongation of a revolving metal drive chain which engages with a rotating gear and has identical chain elements which are periodically arranged over the length of the chain. This method comprises: (a) the use of a first stationary sensor for detecting the passage movement of the chain elements; and (b) the use of a second sensor for detecting the rotational movement of the gear by detecting the passage movement of the teeth of the gear for said second sensor. The method also includes a step for measuring the rotational speed of the chain which is determined from the rotational movement of the gear which is detected using the second sensor, and the distance between adjacent chain elements which is detected using the first sensor and the distance between adjacent chain elements which is detected using the first sensor, taking into account the rotational speed of the chain.

Nevertheless, the method described in patent document EP1850087 is not viable in conveyor belts with links made from thermoplastic materials. This lack of viability is due to the fact that sensors cannot be placed very close to the gears for measuring the angular speed by means of detecting the passage of the teeth because: (i) they are hard to access and the wirings that are always located in the areas with movement are dangerous; (ii) the area of the gears is one of the most problematic areas in terms of cleaning and it is therefore the area with the most emphasis, using water and more aggressive cleaning systems on them; (iii) due to what has been described above and to the accumulation of product and waste in that area, particles may appear between the sensor and the teeth of the gear, preventing measurement or causing a false measurement; (iv) in plastic conveyor belts, only the central gear which is the one guiding the conveyor belt is retained, the others move in the shaft due to the changes in temperature and to expansions and shrinkages, therefore it would be impossible to place the sensors in those moving gears, and they must therefore be installed in the central gear, making it difficult to bring the installation and wiring thereto; (v) furthermore, since the sensors must be positioned as close as possible to the tooth of the gear, vibrations will be transmitted, where erroneous and false signals may be received; (vi) due to their actual weight and the loads they support, movements that do not describe perfect circumferences occur due to the deflection of the shaft, which movements will also generate erroneous and false signals; (vii) the gears used are made of plastic and the teeth wear away gradually, causing poor detection.

All these factors will make the reading of the sensor placed in the gears and proposed in the method of patent document EP1850087 impossible with plastic modular belts.

In conclusion, plastic modular conveyor belts undergo elongations due to, among other reasons: (a) the working temperature; in general, since they are plastic materials, changes in temperature tend to significantly affect their thermal and mechanical properties which in turn cause changes in the passage of the conveyor belt as it stretches and shrinks with those changes; (b) the stretching of the modules forming it; the modules are generally made from plastic materials, so elongations caused by wear and applied loads which lead to changes of said passage occur; (c) the stretching of the hinge thereof; these may be part of the modules (rodless belts) or different components (with a rod); in this second case, they are usually also made from plastic materials, so elongations which also cause changes of said passage occur; (d) the module-hinge assembly, as a result of the operation and use thereof, experiences wear mainly caused by the assembly rotating about itself and to the applied load which in turn lead to changes of said passage; (e) the operation and exposure to tensile stresses or tension with load, causing stretching and modifications of their mechanical properties; and (f) operation in circular movements, i.e., the belt rotates about itself as it passes the gears, causing continuous friction of their hinges (with or without a hinge rod), and thereby causing wear and elongation that will be greater and quicker at higher speeds.

A system and method which allows correctly calculating the elongation in modular conveyor belts formed by modules or links made of a thermoplastic material is therefore required.

DISCLOSURE OF THE INVENTION

An object of the present invention is a system and method for monitoring modular conveyor belts formed by modules or links made of thermoplastic material, solving the problems indicated in the prior art. This objective is achieved with the features of the system of claim 1 and the steps of the method of claim 9. Other practical embodiments of the invention are inferred from the features described in the dependent claims.

An object of the present invention is to measure the time of passage of at least one indication placed at one end of a rotating shaft, specifically in the drive shaft, outside the product conveyance area, through a sensor placed in a position integral with said shaft, measuring the time of each rotation of the indication in the shaft. Furthermore, the system comprises a plurality of indications, at least one per module of the plastic modular belt; wherein said indications are located at regular intervals between each of the modules making up the plastic conveyor belt, such that at least one sensor placed on at least one side of the plastic conveyor belt detects the passage of each indication, measuring the time of passage of each indication.

An object of the invention is to calculate the elongation between each of the indications placed on the belt, this value not being conditioned to a single measurement, and therefore to the sum of all the passages of a complete turn of the belt, knowing the state thereof at all times, practically in real time, unlike the system described in patent documents U.S. Pat. No. 5,291,131, ES2566627T3, and EP1464919. On the other hand, the placement of an indication at the end of the rotating shaft, in a secure manner outside the product conveyance area, and a sensor close to it, assures that it is free from possible damage and erroneous measurements like in patent document EP1850087. Finally, by measuring the passage with a single sensor, the problem set forth in patent document GB2406844 does not arise either as the present invention does not envisage two sensors located at a fixed distance apart nor does it envisage problems relating to a very small size, with all the signals being mixed up.

In a particular embodiment of the invention, a step for measuring the temperature (by means of a sensor intended for that purpose) is established, where temperature is a parameter required for correctly calculating the stresses and working conditions the conveyor belt is exposed to at all times, and it would therefore be possible to obtain a system offering information relating to the temperature, linear speed, percentage of resistance allowed vs. used, percentage of load allowed vs. used, prediction of possible gear slips due to excessive load, change in the chain at the end of its service life, the need for preventive maintenance by removing modules from the belt so as to provide more tension and so that the belt works properly, and all this in an immediate manner and so that it works in optimal conditions for prolonging its service life or the established maximum duration.

Throughout the description and claims, the word "comprises" and variants thereof do not seek to exclude other technical features, supplements, components or steps. For those skilled in the art, other objects, advantages, and features of the invention will be inferred in part from the description and in part from the practice of the invention. The following examples and drawings are provided by way of illustration and they are not meant to limit the present invention. Furthermore, the present invention covers all the possible combinations of particular and preferred embodiments herein indicated.

BRIEF DESCRIPTION OF THE DRAWINGS

A series of drawings which help to better understand the invention and are expressly related to an embodiment of said invention presented as a non-limiting example thereof is very briefly described below.

DISCLOSURE OF A DETAILED EMBODIMENT OF THE INVENTION

Figure 1:
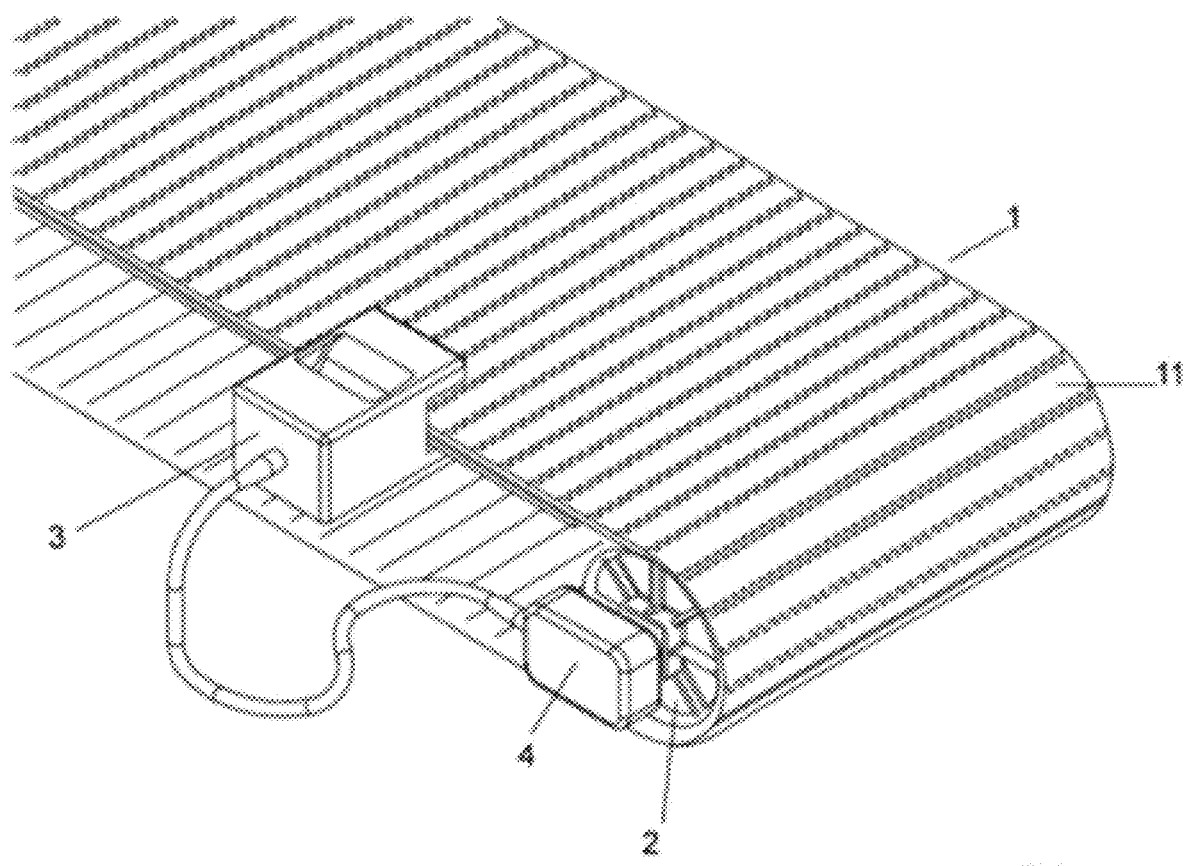
FIG. 1 shows a schematized view of a modular conveyor belt implementing the system object of the present invention.

As indicated above, the object of the present invention is to create a control system in conveyor belts 1 for providing immediate information about their behavior during operation. To that end, the present invention proposes measuring certain specific times for calculating the passage of the conveyor belt 1 when it is in operation for the purpose of assessing the modifications that have occurred and acting accordingly. "Passage" is understood as a reference between two repeating consecutive points equidistant from one another along the entire conveyor belt 1, where this reference is a distance which in turn corresponds with the passage between the teeth of the gear 2 driving the modular conveyor belt 1.

Referring to the attached drawings, the system of the invention is configured in a modular conveyor belt 1 which comprises a plurality of plastic modules (11, 11', 11", 11''', 11'''') linked together to form a continuous path operated by a gear 2. In this particular non-limiting embodiment, the modules (11, 11', 11", 11''', 11'''') are defined by a planar core with a thickness that coincides with the thickness of the belt, from the longitudinal edges of which there emerge a plurality of protuberances like one-piece elements distributed in a staggered pattern on both edges, said protuberances being configured to give passage to the hinge pins between modules (11, 11', 11", 11''', 11''''), forming the modular belt 1 itself which is driven by means of a gear 2 or sprocket.

The invention comprises at least two sensors: (a) a first sensor 33 configured for detecting the passage of a plurality of reference elements (10, 10', 10", 10''', 10'''') inserted in the modular belt 1, in this particular embodiment, at least one indication per module (11, 11', 11", 11''', 11''''); and (b) a second sensor 43 configured for detecting the passage of a reference element 22 in the drive shaft 21.

In a particular embodiment, the system comprises a temperature sensor (34) since temperature is a very important factor in studying the behavior of modular belts 1. The measurement of the working temperature of the modular belt 1, i.e., the measurement at which each of the modules (11, 11', 11", 11''', 11'''') making up the modular belt 1 works, is a value which conditions its operation. The measurement of the working temperature in the room will be an estimate which will usually be sufficient. Therefore, the measurement of the temperature must be performed as close as possible to the modular belt 1 to thereby also estimate that actual temperature. Nevertheless, a temperature sensor 34 can be implemented for obtaining an actual measurement of the working temperature of each module, obtaining results of the working conditions of the conveyor belt with the temperature that are much more precise.

With the detection of temperature, of temporary references with the first and second sensors (33, 43), and the subsequent calculation of the passage at that time, the change in elongation with respect to the nominal measurement and tolerance thereof can be calculated, successfully calculating at all times: (i) if the conveyor belt 1 will engage properly upon reaching the gear 2, or otherwise, if it may slip out of engagement, damaging both the surface of the belt 1 and the teeth of the gear 2; (ii) if it is exposed to permanent deformations and/or breakages upon reaching, exceeding, or approaching its elastic and/or breaking limit; (iii) if it requires any maintenance to give more tension to the system; (iv) if it will require replacement in a short period of time; (v) if it is working outside the allowed temperature limits; and even (vi) the conveyed load which is referred to as production in manufacturing processes; (vii) the uniformity of the production through the supported loads and the resistance to which the belt is subjected.

Figure 2:
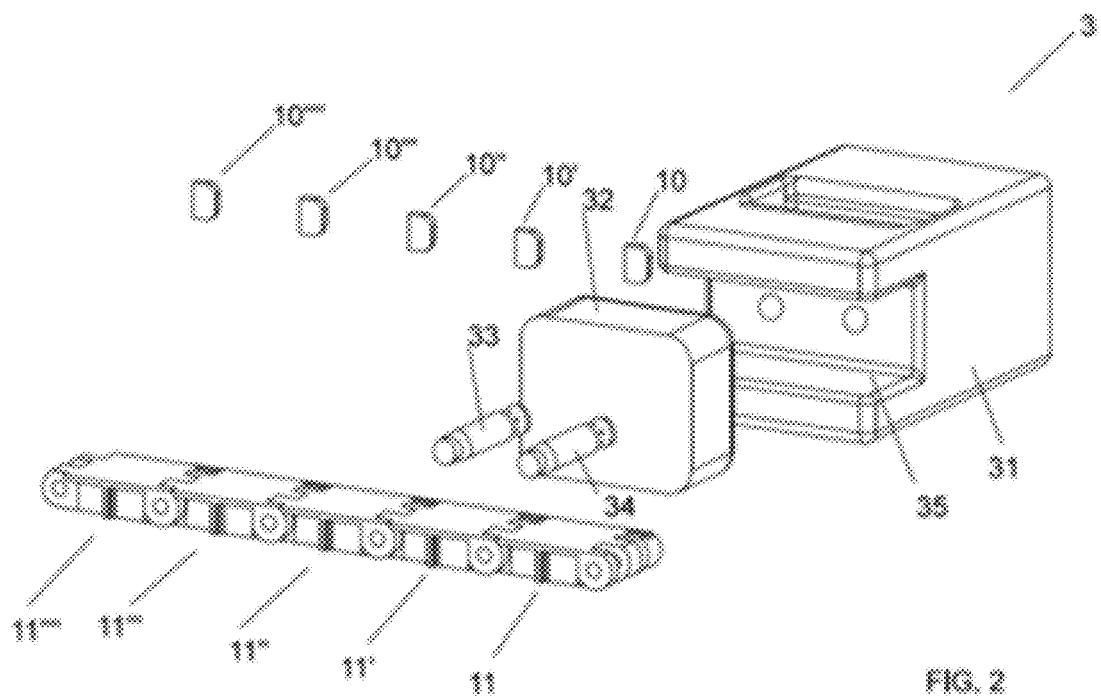
FIG. 2 shows an exploded view of the passage detecting apparatus (3) for detecting the passage of the conveyor belt (1) of FIG. 1.

FIG. 2 shows an exploded view of a first passage detecting apparatus 3 for detecting the passage of the reference elements (10, 10', 10", 10''', 10'''') inserted in the modules (11, 11', 11", 11''', 11'''') of the belt 1; in this particular embodiment, there is one indication per module. This first apparatus 3 comprises an inverted C-shape casing 31, such that the belt 1 passes precisely through the concave region 35 of said casing 31 which is configured for the belt 1 to slide through said concave region 35.

Figure 3:
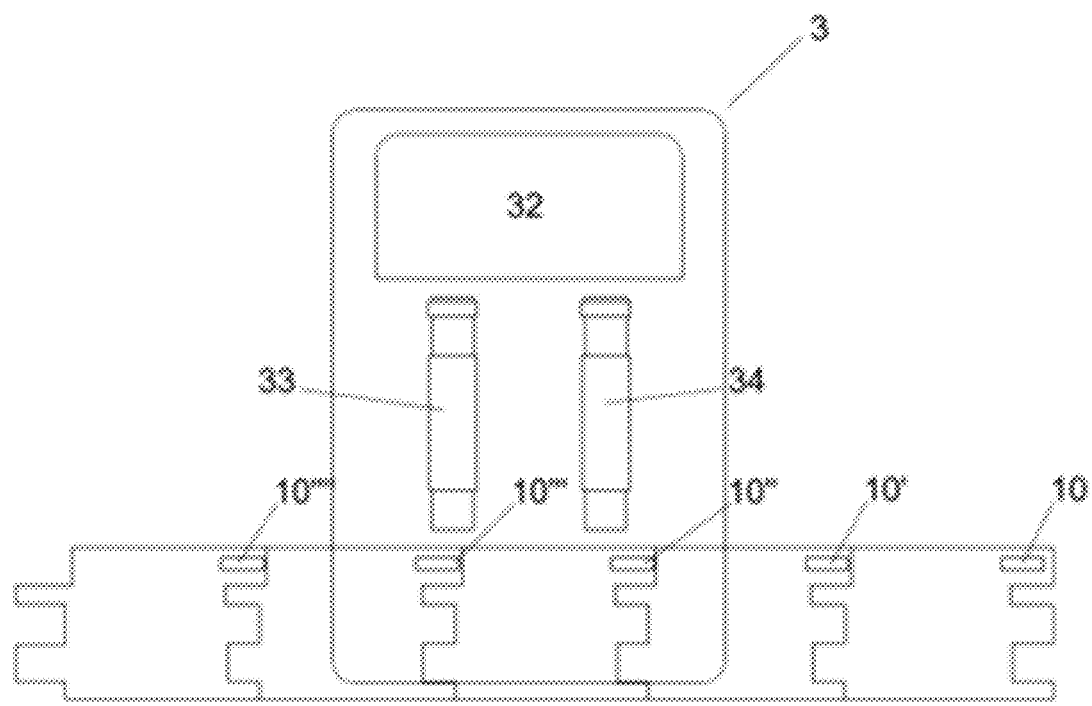
FIG. 3 shows a plan view of the passage detecting apparatus (3) for detecting the passage of the conveyor belt (1) of FIG. 1.

Two sensors, one passage detection sensor (33) and another temperature sensor (34), are housed in the casing 31 (as best seen in FIG. 3) connected with a signal processing circuit 32. The object of the passage detection sensor 33 is precisely to detect the passage of the reference elements located on the conveyor belt (in FIG. 3, the third indication 10" and the fourth indication 10''') so that after acquiring the signal from the passage detection sensor 33, the time of passage between consecutive pairs of reference elements is calculated.

More passage detection sensors 33 or temperature sensors 34 can be incorporated.

Nevertheless, in the case of the invention, the passage detection sensors 33 are not conditioned to be at a specific distance apart, which distance is smaller than the distance of the passage of the chain (like in patent document GB2406844).

Figure 4:
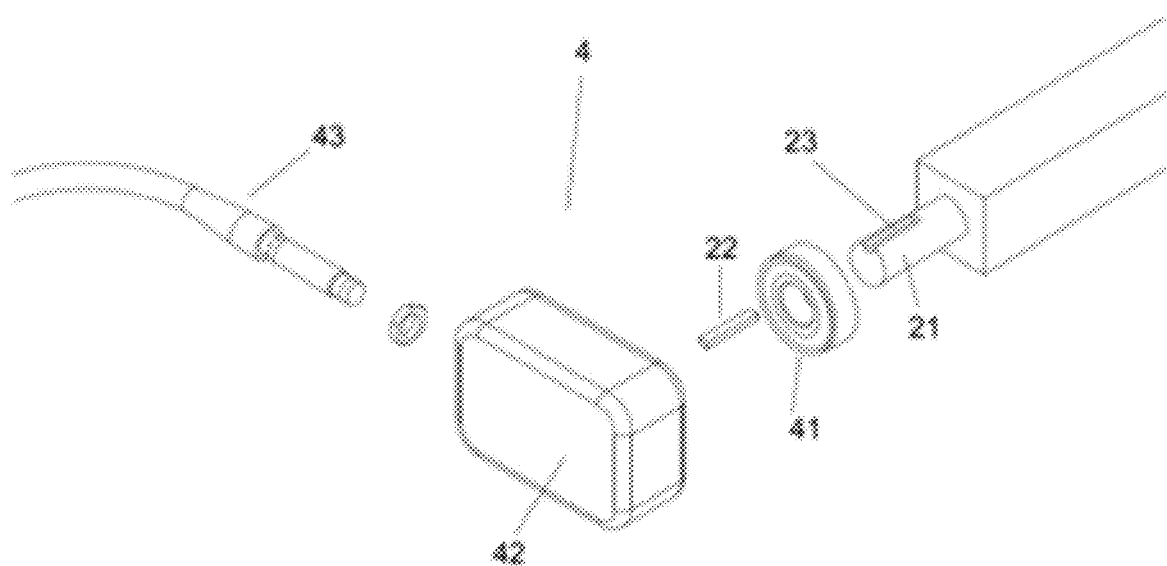
FIG. 4 shows an exploded view of the passage detecting apparatus (3) for detecting the passage of the shaft (21) of the gear (2) of the modular belt (1) of FIG. 1.

FIG. 4 shows a view of the second passage detecting apparatus 4 for detecting passage in the rotating shaft 21. This rotating shaft 21 (preferably a drive shaft) is cottered 23 in this non-limiting example and houses a reference element 22, which is detected by means of a passage detection sensor 43 which is suitably fixed to the casing 42 which is in turn fixed to the rotating shaft 21 by means of a bearing 41 so as not to hinder its rotation therein.

The output signal of the sensor 43 is connected with the signal processing circuit 32 located inside the first apparatus 3. The second apparatus 4 is therefore prepared for detecting the time of passage of the reference element 22 of the rotating shaft 21, such that this time reference will then allow calculating the linear speed of the modular belt 1.

In a practical embodiment, the signal processing circuit 32 comprises at least of one receiver-emitter system with an embedded operating system and a memory sufficient for processing and storing, in the form of matrices, the signals received from the sensors 33, 34 and 43 including instructions for: (a) receiving and interpreting the signals; (b) calculating the detection times between consecutive signals $T_V$ and $T_P$; (c) storing them preferably in matrices; and (d) delivering all those detection times between reference elements $T_V$ and $T_P$, as well as the temperature values at all times to an external server.

The technology used for the detection of passage and temperature in the sensors 33, 34, and 43 can be any technology selected from inductive sensors, capacitive sensors, laser sensors, optical sensors, magnetic sensors, color sensors, infrared sensors, radiofrequency sensors, ultrasound sensors, or any combination thereof.

The method for monitoring modular conveyor belts 1 implemented in the system illustrated in FIGS. 1 to 4 comprises:

(a) a signal measurement step which in turn comprises: (i) calculating the time of consecutive passage $T_V$ of the reference element 22 placed or inserted on the drive shaft 21 of the gear 2 by means of the second apparatus 4; and (ii) calculating the time of passage of the indication 33, $T_P$ inserted in the modules 11 of the modular belt 1 by means of the first apparatus 3 and (iii) measured through the sensor 34 of the temperature $T_A$;

(b) a delivery step for delivering the detection times between reference elements $T_V$ and $T_P$ and temperature $T_A$ to an external server; and (c) step for processing in the external server the signals received in step (b), and calculating the speed of the modular belt 1 and the possible elongation thereof.

In step (b), it is important to deliver the unprocessed signals, i.e., delivering the detection times between indication of the shaft $T_V$ (which is the time for calculating the speed of the modular belt 1) and the detection times between reference elements of the passage $T_P$ (time for calculating the passage) since the processing time in the actual processor circuit 32 is thereby reduced, and simplifying the programming and maintenance thereof. Furthermore, as a result of the above, the reference data from the external server can be modified to enable using the system in different types of belts 1 and gears 2 according to each specific application, without the need to reprogram the processor circuit 32.

In step (c), the values used are previously determined depending on the material of the belt 1, its hinge, the shaft, its gears 2, coefficients of friction, and together with the temperature value $T_A$, the rest of the data can be provided in the external server, where said data can be consulted by means of connection with fixed and/or mobile devices anytime and anywhere.

Therefore, in step (c) and by knowing the reference of the indication placed on the drive shaft and applying the following mathematical formula, the linear speed thereof will be obtained:

Linear speed $V=2\pi r/T_v$ where:
V: linear speed
$T_v$: time unit between two consecutive detections of the passage of the indication over the sensor in the drive shaft.
r: radius or distance at which the indication is placed in the shaft Once this speed is obtained, the real value will be used at all times or the averaged value will be used, depending on processing need and speeds. With this value of speed and the time between consecutive reference elements placed on the conveyor belt, $T_P$, the actual passage is obtained in each passage:

Actual passage=$V \times T_P$

Based on these values and the obtained temperature value, comparing them with the reference values and applying the corresponding formulas, there will be shown important immediate information, such as: temperature, linear speed, percentage of resistance the belt is using at that time, "elongation vs. engagement" with the subsequent prediction of possible gear slips due to excessive load, or change due to the service life coming to an end, the need for preventive maintenance to remove rows from the belt so as to provide more tension thereto, and so that it works in optimal conditions for its service life and maximum duration.

The invention claimed is:

1. A system for monitoring modular conveyor belts which comprises:
   a modular conveyor belt comprising a plurality of modules made from a plastic material and linked together to form a continuous path operated by a gear which in turn comprises a shaft; and
   at least two passages detecting apparatus;
   wherein
   the modules have inserted in their longitudinal edges a plurality of first reference elements, at least one first reference element per module; and wherein the first reference elements are placed equidistant from one another along the entire modular conveyor belt;
   the first passage detecting apparatus comprises a first passage detection sensor to detect the passage of two consecutive first reference elements inserted in the longitudinal edges of the modules, wherein said passage corresponds with the passage between a teeth of the gear driving the modular conveyor belt;
   the second passage detecting apparatus comprises at least a second passage detection sensor to detect the passage of a second reference element housed in a cottered drive shaft; and wherein the second passage detection sensor is fixed to a casing coupled at one end of the shaft on which the gear is also coupled; and
   wherein the output signal of the second passage detection sensor is connected with a signal processing circuit placed inside the first passage detecting apparatus in such a way that the second passage detecting apparatus is further arranged to detect the time of passage of the second reference element of the drive shaft to calculate the linear speed of the modular belt.

2. The system according to claim 1 comprising a temperature sensor arranged in a position close to the modular conveyor belt and the gear.

3. The system according to claim 1, wherein the first apparatus comprises a casing.

4. The system according to claim 3, wherein the casing houses two sensors, one passage detection sensor and another temperature sensor; and wherein said sensors are connected with a signal processing circuit.

5. The system according to claim 1, wherein the casing is suitably fixed to the rotating shaft by means of the coupling thereof with a bearing.

6. The system according to claim 4 wherein the signal processing circuit comprises at least one processor, a memory, a communications receiver-emitter, and a program or programs, wherein the program or programs are stored in the memory and configured for being run by means of the processor, and wherein the programs include instructions for:
   (a) conditioning the signals of the first apparatus and the second apparatus;
   (b) calculating detection times ($T_V$ and $T_P$) between reference elements and measuring a temperature signal ($T_A$) by means of a temperature sensor; and
   (c) delivering the detection times ($T_V$ and $T_P$) between reference elements and the measurement of the temperature ($T_A$) to an external server.

7. The system according to claim 6, wherein the temperature sensor, the first passage detection sensor of the first apparatus, and the second passage detection sensor of the second apparatus is a sensor selected from inductive sensors, capacitive sensors, magnetic sensors, laser sensors, infrared sensors, optical sensors, colour sensors, radiofrequency sensors, ultrasound sensors, or any combination thereof.

8. A method for monitoring modular conveyor belts implemented in a system according to claim 1 comprising:
- a modular conveyor belt with a plurality of modules made from a plastic material and linked together to form a continuous path operated by a gear which in turn comprises a shaft;
- wherein the method further comprises the steps of:
  - (a) a signal measurement step which in turn comprises:
    - (i) calculating the time of consecutive passage ($T_V$) of the second reference element housed in a cottered drive shaft of the gear by means of the second passage detection sensor;
    - (ii) calculating the time of passage ($T_P$) between two consecutive first reference elements inserted in the longitudinal edges of the modules of the modular belt by means of a second first passage detection sensor wherein said passage corresponds with the passage between the teeth of the gear driving the modular conveyor belt; and
    - (iii) measuring the temperature ($T_A$);
  - (b) a delivery step for delivering the detection time of the second reference element ($T_V$), the detection time between two consecutive first reference elements ($T_P$), and temperature ($T_A$) to an external server; and
  - (c) processing the signals ($T_A$, $T_V$ and $T_P$) received in step (b) in the external server, and calculating the speed of the modular belt and the elongation of at least one module of the modular belt;
  - (d) instantly showing all the information relating to the state and prevention of the conveyor belt, on a platform accessible from any mobile and/or fixed device.

* * * * *